United States Patent [19]

Tucker et al.

[11] 4,195,421
[45] Apr. 1, 1980

[54] SHAPE MATCHING DEVICE

[75] Inventors: James E. Tucker, Oak Park; Burton C. Meyer, Downers Grove, both of Ill.

[73] Assignee: Marvin Glass & Associates, Chicago, Ill.

[21] Appl. No.: 957,971

[22] Filed: Nov. 6, 1978

[51] Int. Cl.² .............................................. G09B 19/00
[52] U.S. Cl. ...................................................... 35/22 A
[58] Field of Search ........................... 35/22 R, 22 A; 273/144 R, 144 A, 144 B; 46/40

[56] References Cited

U.S. PATENT DOCUMENTS

| 741,903 | 10/1903 | Gates | 35/22 A |
|---|---|---|---|
| 2,911,740 | 11/1959 | Miller | 35/22 A |
| 3,468,542 | 9/1969 | Ernst | 273/144 R |
| 4,008,526 | 2/1977 | Swett et al. | 35/22 A |

Primary Examiner—John W. Shepperd
Attorney, Agent, or Firm—Mason, Kolehmainen, Rathburn & Wyss

[57] ABSTRACT

A shape matching device includes a frame for rotatably supporting a generally conical container having a plurality of input apertures in a circumferential mantle. Each input aperture is shaped and dimensioned to allow insertion into the container of only one of a plurality of associated blocks. The tapered end of the container is truncated to provide an exit aperture dimensioned for unobstructed ejection of the associated blocks from the container. Along the interior surface of the mantle, a pair of curved longitudinal ribs is provided to support the blocks when the container is rotated in a counterclockwise direction and provide a gravitational slide for the blocks toward the exit aperture.

10 Claims, 3 Drawing Figures

U.S. Patent
Apr. 1, 1980
4,195,421
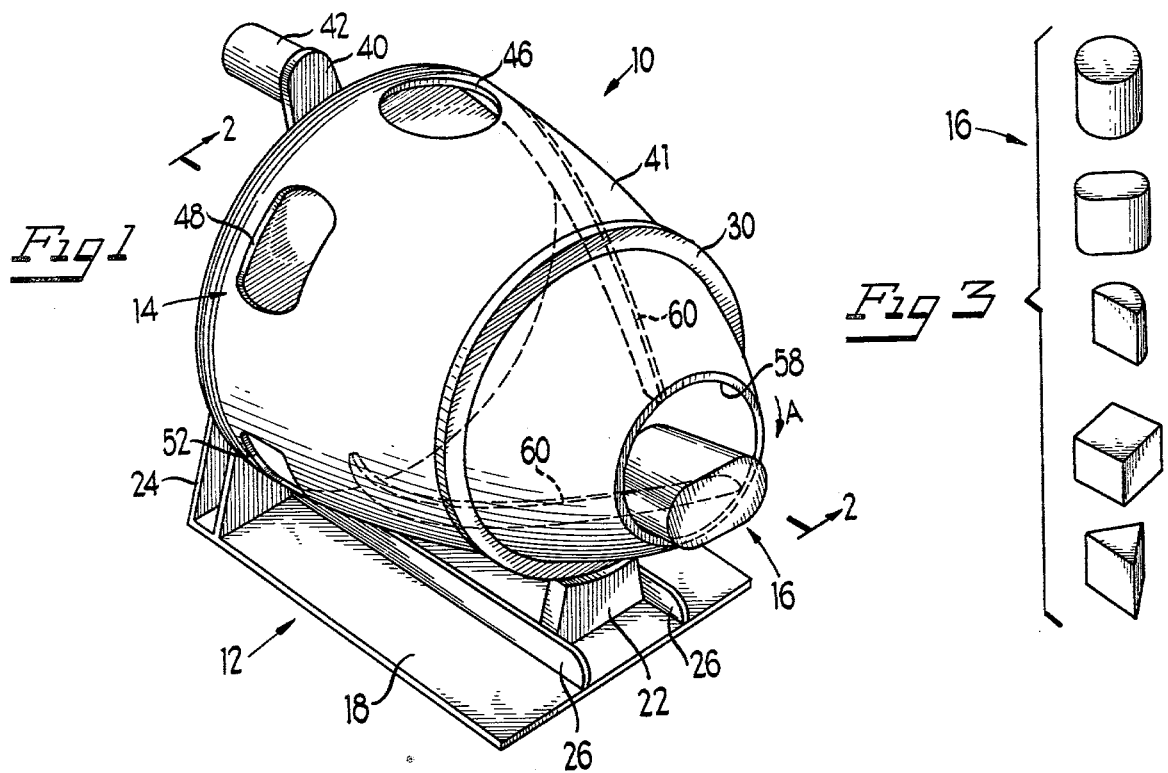
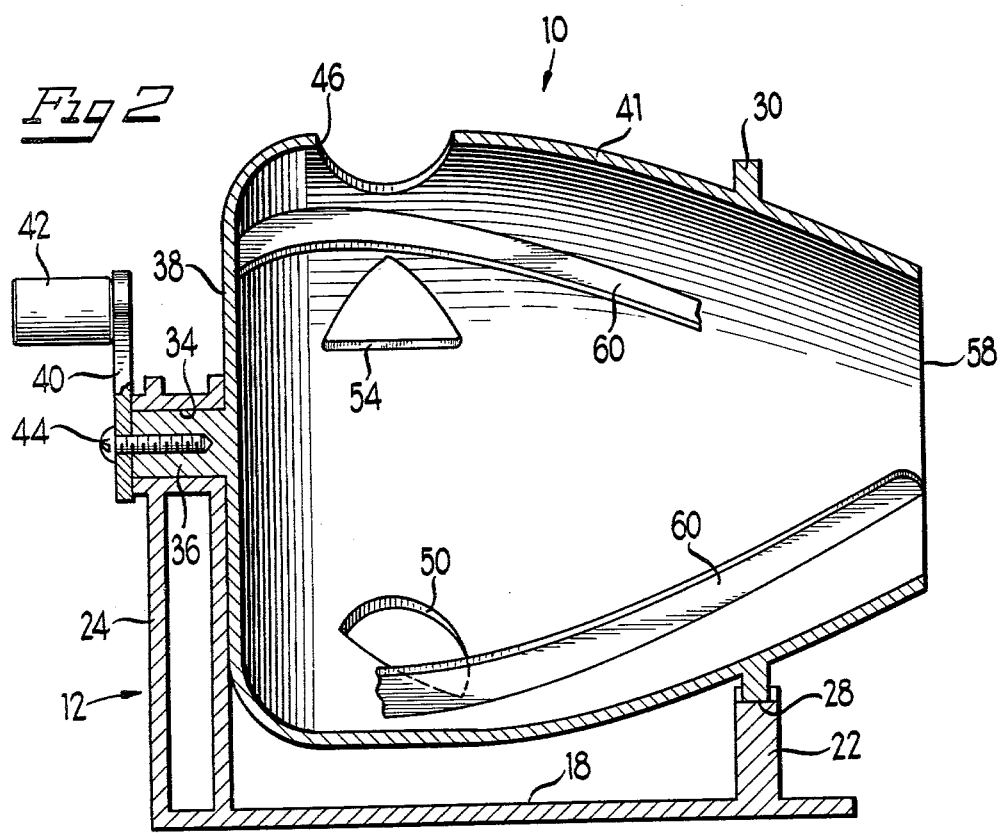

SHAPE MATCHING DEVICE

BACKGROUND OF THE INVENTION

This invention relates to a shape matching device suitable for use especially by young children and designed to advance their experimental facilities and their capacities for visual and tactile matching of dimensions and configurations of objects.

It has been found that operation of the shape matching arouses and sustains the interest of young children and may assist them in improving their experimental faculties and their tactile and visual recognition of corresponding shapes, dimensions, colors and symbols.

Devices for exercising and developing a child's faculties for recognizing and matching configurations are well known and include such games as picture puzzles to be assembled by juxtaposing a plurality of cutouts of various shapes and sizes. The assembly of predetermined or free form structures from a variety of different interconnectible or stackable building elements is also well known. These known games usually call for the planar or three-dimensional matching of shapes and sizes and may be unsuitable for individuals desiring operation of a mechanical device, or utilization of a mechanical principle of locomotion by means which may be visually recognizable or which may be partly obscured.

The present invention seeks to satisfy the continuing need for a shape matching device in which experimental visual or tactile matching of three-dimensional blocks into apertures may be practiced and in which successful matching may immediately be confirmed by the reception of the matched block into a container from which it may be expelled axially in response to manual rotation of the container. A plurality of users may utilize a single shape matching device cooperatively or a plurality of shape matching devices competitively.

SUMMARY OF THE INVENTION

The present invention relates to a shape matching device in which blocks may be inserted into a generally conical container through matching apertures provided in the container's circumferential mantle. The container is open at its tapered end, has a closure wall at its opposite end and is rotatably mounted in a generally L-shaped frame. Longitudinally curved ribs extend along the interior surface of the circumferential mantle and cooperate therewith in such a manner as to limit peripheral sliding of blocks inserted into the container when it is rotated and to provide a slide for such blocks toward the exit aperture.

Other objects, features and advantages of the invention will be apparent from the following detailed description taken in connection with the accompanying drawings.

BRIEF DESCRIPTION OF THE DRAWINGS

FIG. 1 is a perspective view of the present invention showing in dotted lines the shape and location of two ribs within the hollow body and one of the associated blocks at the exit aperture;

FIG. 2 is a vertical sectional view taken generally along line 2—2 of FIG. 1; and FIG. 3 is a perspective view of an array of matching blocks suitable for use with the invention.

DETAILED DESCRIPTION OF THE PREFERRED EMBODIMENT

The shape matching device of the present invention comprises a container in the form of a hollow body having the general shape of a convex cone, generally designated 10, which is rotatably mounted on a frame, generally designated 12. A plurality of apertures 14 are provided and receive variously shaped blocks 16. The elements comprising the present invention may be manufactured from transparent or opaque plastic or other suitable, reasonably rigid material.

The frame 12 comprises a generally rectangular base plate 18 for supporting the device on a suitable surface. A front support member 22 and a rear support member 24 project upwardly from the front and rear portions of base plate 18 to rotatably support the container 10. A pair of spaced reinforcing ribs 26 extend longitudinally over the intermediate top surface of base plate 18. The top of support 22 contains an arcuate groove 28 which is engaged by and supports a circumferential rail 30 mounted on the front portion of container 10.

The rear support 24 includes a pair of vertical walls terminating in an upper bushing 34 to journal a trunion shaft 36 extending from the rear wall 38 of the container 10. A crank 40 having a handle 42 is secured to the end of the trunion shaft 36 by a screw 44 to allow conventional manual rotation of container 10 when mounted in frame 12.

A circumferential mantle of container 10 is provided with a plurality of input apertures 46, 48, 50, 52 and 54. The configuration and dimensions of each of the apertures corresponds to the cross-section of only one of the blocks 16 so that only one of the blocks 16 may be inserted into the container through each input apertures 46–54. An exit aperture 58 is provided at the tip of container 10 and dimensioned to permit unobstructed expulsion of blocks 16 from the interior of container 10.

A pair of longitudinally curved ribs 60 extend along the interior wall of circumferential mantle from the wall 38 to the exit aperture 58. The opposite ends of each rib are radially offset by approximately 90 degrees with respect to each other to provide a convex longitudinal wall or shelf. The height of each shelf 60 exceeds approximately one-half of the dimension of the largest cross-section of any one of blocks 16 to restrain the blocks against sliding more than 180 degrees along the interior surface of the mantle when container 10 is rotated. When such rotation is in a clockwise direction as shown in FIG. 1 by arrow A, the blocks 16 are carried in a rotary path until gravity causes them to slide toward exit 58 in the guiding pocket formed by the convex side rib 60 and the portion of mantle 41 immediately adjacent thereto. During counterclockwise rotation of container 10, the blocks 16 will be caught on the opposite side of rib 60 which does not provide a gravitational slide toward exit aperture 58. Such blocks will consequently tumble down to the lowest portion of container 10 as counterclockwise rotation continues beyond approximately 90 degrees.

The shape matching device forming the subject matter of the present invention may be utilized by selecting one block, e.g., the top cylindrical block, matching it by visual or tactile perception to its appropriate input aperture, i.e., 46, orienting the block properly with respect to said aperture and inserting it into container 10 through said aperture. After all blocks have been similarly switched to and inserted through their corresponding input apertures into container 10, the blocks 16 may be mixed up by counterclockwise manual rotation of container 10 by means of crank 40. Thereafter, the blocks 16 may be expelled from container 10 in a random sequence by relatively slow clockwise rotation of crank 40.

It will be apparent that the various steps in operating the step matching device of the present invention may be performed by various individuals and that several shape matching devices may be operated competitively by several individuals. It will also be apparent that clues in the form of coloration or symbols may be applied to blocks 16 and their corresponding input apertures to aid in matching. Furthermore, the container 10 may be made entirely or in part of transparent material to allow observation of blocks 16 within the container, or it may be made of opaque material to obscure blocks 16 from view after insertion into container 10.

The foregoing detailed description has been given for clearness of understanding only and no unnecessary limitations should be understood therefrom as some modifications will be obvious to those skilled in the art.

We claim:

1. A shape matching device, comprising:
   a hollow generally symmetrical housing having a wall at one end and an exit aperture at the opposite end;
   a circumferential mantle extending axially from said closed end and converging to define said exit aperture;
   a plurality of circumferentially spaced apertures in said mantle;
   a plurality of blocks associated by shape with the apertures, each block having a cross-sectional dimension and configuration corresponding generally to the configurations and dimensions of one of said apertures so as to resist manual insertion thereof into the hollow housing through all but a complementary shaped one of said apertures;
   means for manually rotating said housing; and
   guide means in the interior of said housing for directing blocks toward said exit aperture in response to rotation of said housing.

2. The shape matching device of claim 1 wherein the shape of said hollow housing is generally conical and convex.

3. The shape matching device of claim 1 wherein said guide means comprises at least one rib extending along the interior wall of said housing generally between the end wall and said exit aperture, the end point of the rib adjacent said exit aperture being offset by approximately 90° with respect to the end adjacent said end wall.

4. The shape matching device of claim 3 wherein said manual rotating means includes a manual crank connected to the exterior of said closure wall.

5. The shape matching device of claim 4 including a trunion shaft extending between said end wall and said manual crank and a frame providing a trunion support.

6. The shape matching device of claim 5 wherein said hollow housing is rotatably mounted in said frame, said frame including a bearing defined in an upright member for journalling said trunion and a support on the frame spaced from said upright member, the upper portion of said support having a bearing surface for engaging and supporting said housing.

7. The shape matching device of claim 6 wherein said hollow housing includes a radial rail on the exterior wall of said circumferential mantle spaced from said exit aperture for engaging said support bearing surface for supporting the forward end of said housing.

8. The shape matching device of claim 1 wherein said guide means comprises a pair of longitudinally extending ribs mounted on the interior wall of said housing, generally between the end wall and said exit aperture, said ribs being curved between the end wall and a terminal point generally adjacent the exit aperture, so that, upon rotation of said housing by said rotating means, blocks within the housing are successively directed and ejected through said exit aperture.

9. An educational shape matching toy, comprising:
   a hollow, generally conically shaped housing, having a wall at one end and an exit aperture at the opposite end;
   a plurality of circumferentially spaced apertures in the wall of the housing;
   a plurality of blocks associated by shape with said apertures, each block having a cross-sectional dimension and configuration corresponding generally to only one of the apertures so as to prevent manual insertion of all but one of the blocks into any one of said apertures;
   selectively operable means for manually rotating said housing, said rotating means including a manual crank connected to the exterior of said closure wall;
   a frame for rotatably mounting said housing; and
   guide means on the interior of said housing for successively directing blocks within the housing toward said exit aperture in response to rotation of said housing.

10. The educational toy of claim 9 wherein said guide means comprises a plurality of radially directed, longitudinally extending ribs secured to the interior wall of said housing generally between the end wall and said exit aperture, said ribs being curved between their end points so as to direct the blocks toward the exit aperture as the manual rotating means is selectively operated to rotate the housing in a predetermined direction.

* * * * *